(12) United States Patent
Partlo et al.

(10) Patent No.: US 7,141,806 B1
(45) Date of Patent: Nov. 28, 2006

(54) EUV LIGHT SOURCE COLLECTOR EROSION MITIGATION

(75) Inventors: William N. Partlo, Poway, CA (US); Alexander I. Ershov, San Diego, CA (US); Igor V. Fomenkov, San Diego, CA (US); David W. Myers, Poway, CA (US); William Oldham, Orinda, CA (US)

(73) Assignee: Cymer, Inc., San Diego, CA (US)

( * ) Notice: Subject to any disclaimer, the term of this patent is extended or adjusted under 35 U.S.C. 154(b) by 0 days.

(21) Appl. No.: 11/237,649

(22) Filed: Sep. 27, 2005

Related U.S. Application Data

(63) Continuation-in-part of application No. 11/174,442, filed on Jun. 29, 2005, and a continuation-in-part of application No. 11/168,190, filed on Jun. 27, 2005.

(51) Int. Cl.
*G01J 1/00* (2006.01)

(52) U.S. Cl. .............................. 250/491.1; 250/504 R; 250/503; 250/504; 219/121.57; 372/38; 372/69; 372/57

(58) Field of Classification Search ...................... None
See application file for complete search history.

(56) References Cited

U.S. PATENT DOCUMENTS

| | | | |
|---|---|---|---|
| 2,740,963 A | 4/1956 | Donovan | 342/34 |
| 2,759,106 A | 8/1956 | Wolter | 250/53 |
| 3,150,483 A | 9/1964 | Mayfield et al. | 60/35.5 |
| 3,232,046 A | 2/1966 | Meyer | 50/35.5 |
| 3,279,176 A | 10/1966 | Boden | 60/202 |
| 3,746,870 A | 7/1973 | Demarest | 250/227 |
| 3,960,473 A | 6/1976 | Harris | 425/467 |
| 3,961,197 A | 6/1976 | Dawson | 250/493 |
| 3,969,628 A | 7/1976 | Roberts et al. | 250/402 |
| 4,009,391 A | 2/1977 | Janes et al. | 250/281 |
| 4,042,848 A | 8/1977 | Lee | 313/231.6 |
| 4,088,966 A | 5/1978 | Samis | 313/231.5 |

(Continued)

FOREIGN PATENT DOCUMENTS

JP   02-105478   4/1990

(Continued)

OTHER PUBLICATIONS

Andreev et al., Enhancement of Laser/EUV Conversion by Shaped Laser Pulse Interacting with Li-Contained Targets for EUV Litography, Proc. of SPIE 5196:128-136, (2004).

(Continued)

*Primary Examiner*—Nikita Wells
*Assistant Examiner*—Zia R. Hashmi
(74) *Attorney, Agent, or Firm*—William C. Cray

(57) ABSTRACT

An EUV light source collector erosion mitigation method and apparatus for a collector comprising a multilayered mirror collector comprising a collector outer surface composed of a capping material subject to removal due to a removing interaction with materials created in an EUV light-creating plasma, is disclosed which may comprise including within an EUV plasma source material a replacement material. The replacement material may comprise the same material as the capping material of the multilayered mirror. The replacement material may comprise a material that is essentially transparent to light in a selected band of EUV light, e.g., a spectrum of EUV light generated in a plasma of a plasma source material. The replacement material may comprise a material not susceptible to being etched by an etching material used to remove deposited plasma source material from the collector, e.g., a halogen etchant.

44 Claims, 1 Drawing Sheet

U.S. PATENT DOCUMENTS

| | | | |
|---|---|---|---|
| 4,143,275 A | 3/1979 | Mallozzi et al. | 250/503 |
| 4,162,160 A | 7/1979 | Witter | 75/246 |
| 4,203,393 A | 5/1980 | Giardini | 123/30 |
| 4,223,279 A | 9/1980 | Bradford, Jr. et al. | 331/94.5 |
| 4,329,664 A | 5/1982 | Javan | 359/276 |
| 4,364,342 A | 12/1982 | Asik | 123/143 |
| 4,369,758 A | 1/1983 | Endo | 123/620 |
| 4,455,658 A | 6/1984 | Sutter, Jr. | 372/38 |
| 4,504,964 A | 3/1985 | Cartz et al. | 378/119 |
| 4,507,588 A | 3/1985 | Asmussen et al. | 315/39 |
| 4,534,035 A | 8/1985 | Long | 372/85 |
| 4,536,884 A | 8/1985 | Weiss et al. | 378/119 |
| 4,538,291 A | 8/1985 | Iwamatsu | 378/119 |
| 4,550,408 A | 10/1985 | Karning et al. | 372/58 |
| 4,561,406 A | 12/1985 | Ward | 123/536 |
| 4,596,030 A | 6/1986 | Herziger et al. | 378/119 |
| 4,618,971 A | 10/1986 | Weiss et al. | 378/34 |
| 4,626,193 A | 12/1986 | Gann | 431/71 |
| 4,633,492 A | 12/1986 | Weiss et al. | 378/119 |
| 4,635,282 A | 1/1987 | Okada et al. | 378/119 |
| 4,751,723 A | 6/1988 | Gupta et al. | 378/119 |
| 4,752,946 A | 6/1988 | Gupta et al. | 378/119 |
| 4,774,914 A | 10/1988 | Ward | 123/162 |
| 4,837,794 A | 6/1989 | Riordan et al. | 378/119 |
| 4,891,820 A | 1/1990 | Rando et al. | 372/93 |
| 4,928,020 A | 5/1990 | Birx et al. | 307/106 |
| 4,959,840 A | 9/1990 | Akins et al. | 372/57 |
| 5,005,180 A | 4/1991 | Edelman et al. | 372/57 |
| 5,022,033 A | 6/1991 | Hackell | 372/25 |
| 5,023,884 A | 6/1991 | Akins et al. | 372/57 |
| 5,023,897 A | 6/1991 | Neff et al. | 378/122 |
| 5,025,445 A | 6/1991 | Anderson et al. | 372/20 |
| 5,025,446 A | 6/1991 | Kuizenga | 372/21 |
| 5,027,076 A | 6/1991 | Horsley et al. | 325/674 |
| 5,070,513 A | 12/1991 | Letardi | 372/83 |
| 5,091,778 A | 2/1992 | Keeler | 348/31 |
| 5,102,776 A | 4/1992 | Hammer et al. | 430/311 |
| 5,126,638 A | 6/1992 | Dethlefsen | 315/326 |
| 5,142,166 A | 8/1992 | Birx | 307/419 |
| 5,142,543 A | 8/1992 | Wakabayashi et al. | 372/32 |
| 5,157,684 A | 10/1992 | Benda et al. | 372/95 |
| 5,175,755 A | 12/1992 | Kumakhov | 378/34 |
| 5,181,135 A | 1/1993 | Keeler | 398/104 |
| 5,189,678 A | 2/1993 | Ball et al. | 372/28 |
| 5,313,481 A | 5/1994 | Cook et al. | 372/37 |
| 5,315,611 A | 5/1994 | Ball et al. | 372/56 |
| 5,319,695 A | 6/1994 | Itoh et al. | 378/84 |
| 5,359,620 A | 10/1994 | Akins | 372/58 |
| RE34,806 E | 12/1994 | Cann | 427/446 |
| 5,411,224 A | 5/1995 | Dearman et al. | 244/53 |
| 5,425,922 A | 6/1995 | Kawaguchi | 422/186 |
| 5,448,580 A | 9/1995 | Birx et al. | 372/38 |
| 5,450,436 A | 9/1995 | Mizoguchi et al. | 372/59 |
| 5,463,650 A | 10/1995 | Ito et al. | 372/57 |
| 5,471,965 A | 12/1995 | Kapich | 123/565 |
| 5,504,795 A | 4/1996 | McGeoch | 378/119 |
| 5,563,555 A | 10/1996 | Nalos et al. | 331/81 |
| 5,729,562 A | 3/1998 | Birx et al. | 372/38 |
| 5,763,930 A | 6/1998 | Partlo | 250/504 |
| 5,852,621 A | 12/1998 | Sandstrom | 372/25 |
| 5,856,991 A | 1/1999 | Ershov | 372/57 |
| 5,863,017 A | 1/1999 | Larson et al. | 248/176.1 |
| 5,866,871 A | 2/1999 | Birx | 219/121 |
| 5,933,271 A | 8/1999 | Waarts et al. | 359/341.31 |
| 5,936,988 A | 8/1999 | Partlo et al. | 372/38 |
| 5,953,360 A | 9/1999 | Vitruk et al. | 372/87 |
| 5,963,616 A | 10/1999 | Silfvast et al. | 378/122 |
| 5,978,394 A | 11/1999 | Newman et al. | 372/32 |
| 5,991,324 A | 11/1999 | Knowles et al. | 372/57 |
| 6,005,879 A | 12/1999 | Sandstrom et al. | 372/25 |
| 6,016,325 A | 1/2000 | Ness et al. | 372/38 |
| 6,018,537 A | 1/2000 | Hofmann et al. | 372/25 |
| 6,028,880 A | 2/2000 | Carlesi et al. | 372/58 |
| 6,031,241 A | 2/2000 | Silfvast et al. | 250/504 |
| 6,031,598 A | 2/2000 | Tichenor et al. | 355/67 |
| 6,039,850 A | 3/2000 | Schulz | 204/192.15 |
| 6,051,841 A | 4/2000 | Partlo et al. | 250/504 |
| 6,064,072 A | 5/2000 | Partlo et al. | 250/504 |
| 6,067,306 A | 5/2000 | Sandstrom et al. | 372/38.01 |
| 6,067,311 A | 5/2000 | Morton et al. | 372/57 |
| 6,094,448 A | 7/2000 | Fomenkov et al. | 372/102 |
| 6,104,735 A | 8/2000 | Webb | 372/37 |
| 6,128,323 A | 10/2000 | Myers et al. | 372/38.1 |
| 6,151,346 A | 11/2000 | Partlo et al. | 372/38 |
| 6,151,349 A | 11/2000 | Gong et al. | 372/58 |
| 6,164,116 A | 12/2000 | Rice et al. | 73/1.72 |
| 6,172,324 B1 | 1/2001 | Birx | 219/121.57 |
| 6,181,719 B1 | 1/2001 | Sukhman et al. | 372/38.1 |
| 6,192,064 B1 | 2/2001 | Algots et al. | 372/99 |
| 6,195,272 B1 | 2/2001 | Pascente | 363/21 |
| 6,208,674 B1 | 3/2001 | Webb et al. | 372/57 |
| 6,208,675 B1 | 3/2001 | Webb | 372/58 |
| 6,219,368 B1 | 4/2001 | Govorkov | 372/59 |
| 6,240,117 B1 | 5/2001 | Gong et al. | 372/58 |
| 6,281,471 B1 | 8/2001 | Smart | 219/121.62 |
| 6,285,743 B1 | 9/2001 | Kondo et al. | 378/119 |
| 6,304,630 B1 | 10/2001 | Bisschops et al. | 378/119 |
| 6,307,913 B1 | 10/2001 | Foster et al. | 378/34 |
| 6,359,922 B1 | 3/2002 | Partlo et al. | 372/58 |
| 6,370,174 B1 | 4/2002 | Onkels et al. | 372/38.04 |
| 6,377,651 B1 | 4/2002 | Richardson et al. | 378/34 |
| 6,381,257 B1 | 4/2002 | Ershov et al. | 372/57 |
| 6,392,743 B1 | 5/2002 | Zambon et al. | 355/69 |
| 6,396,900 B1 | 5/2002 | Barbee, Jr. et al. | 378/84 |
| 6,404,784 B1 | 6/2002 | Komine | 372/9 |
| 6,414,979 B1 | 7/2002 | Ujazdowski et al. | 372/87 |
| 6,442,181 B1 | 8/2002 | Oliver et al. | 372/25 |
| 6,452,194 B1 | 9/2002 | Bijkerk et al. | 250/492.2 |
| 6,452,199 B1 | 9/2002 | Partlo et al. | 250/504 |
| 6,466,602 B1 | 10/2002 | Fleurov et al. | 372/87 |
| 6,477,193 B1 | 11/2002 | Oliver et al. | 372/58 |
| 6,493,374 B1 | 12/2002 | Fomenkov et al. | 372/102 |
| 6,493,423 B1 | 12/2002 | Bisschops | 378/119 |
| 6,529,531 B1 | 3/2003 | Everage et al. | 372/20 |
| 6,532,247 B1 | 3/2003 | Spangler et al. | 372/61 |
| 6,535,531 B1 | 3/2003 | Smith et al. | 372/25 |
| 6,538,737 B1 | 3/2003 | Sandstrom et al. | 356/334 |
| RE38,054 E | 4/2003 | Hofmann et al. | 372/25 |
| 6,541,786 B1 | 4/2003 | Partlo et al. | 250/504 |
| 6,549,551 B1 | 4/2003 | Ness et al. | 372/38.07 |
| 6,553,049 B1 | 4/2003 | Besaucele et al. | 372/57 |
| 6,566,667 B1 | 5/2003 | Partlo et al. | 250/504 |
| 6,566,668 B1 | 5/2003 | Rauch et al. | 250/504 |
| 6,567,450 B1 | 5/2003 | Myers et al. | 372/55 |
| 6,567,499 B1 | 5/2003 | McGeoch | 378/119 |
| 6,576,912 B1 | 6/2003 | Visser et al. | 250/492.2 |
| 6,584,132 B1 | 6/2003 | Morton | 372/57 |
| 6,586,757 B1 | 7/2003 | Melnychuk et al. | 250/504 |
| 6,590,922 B1 | 7/2003 | Onkels et al. | 372/57 |
| 6,590,959 B1 | 7/2003 | Kandaka et al. | 378/119 |
| 6,618,421 B1 | 9/2003 | Das et al. | 372/55 |
| 6,621,846 B1 | 9/2003 | Sandstrom et al. | 372/57 |
| 6,625,191 B1 | 9/2003 | Knowles et al. | 372/55 |
| 6,635,844 B1 | 10/2003 | Yu | 219/121.68 |
| 6,647,086 B1 | 11/2003 | Amemiya et al. | 378/34 |
| 6,671,294 B1 | 12/2003 | Kroyan et al. | 372/20 |
| 6,714,624 B1 | 3/2004 | Fornaciari et al. | 378/119 |
| 6,721,340 B1 | 4/2004 | Fomenkov et al. | 372/25 |
| 6,744,060 B1 | 6/2004 | Ness et al. | 250/504 |
| 6,757,316 B1 | 6/2004 | Newman et al. | 372/57 |
| 6,765,945 B1 | 7/2004 | Sandstrom et al. | 372/57 |
| 6,782,031 B1 | 8/2004 | Hofmann et al. | 372/90 |
| 6,795,474 B1 | 9/2004 | Partlo et al. | 372/57 |
| 6,804,327 B1 | 10/2004 | Schriever et al. | 378/119 |

| | | | |
|---|---|---|---|
| 6,815,700 B1 | 11/2004 | Melnychuk et al. | 250/504 R |
| 6,822,251 B1 | 11/2004 | Arenberg et al. | 250/504 |
| 6,865,255 B1 | 3/2005 | Richardson | 378/119 |
| 2001/0006217 A1 | 7/2001 | Bisschops | 250/493.1 |
| 2001/0055364 A1 | 12/2001 | Kandaka et al. | 378/119 |
| 2002/0009176 A1 | 1/2002 | Ameniya et al. | 378/34 |
| 2002/0012376 A1 | 1/2002 | Das et al. | 372/58 |
| 2002/0048288 A1 | 4/2002 | Kroyan et al. | 372/20 |
| 2002/0100882 A1 | 8/2002 | Partlo et al. | 250/504 |
| 2002/0114370 A1 | 8/2002 | Onkels et al. | 372/55 |
| 2002/0141536 A1 | 10/2002 | Richardson | 378/119 |
| 2002/0162973 A1 | 11/2002 | Cordingley et al. | 250/492.2 |
| 2002/0168049 A1 | 11/2002 | Schriever et al. | 378/119 |
| 2003/0068012 A1 | 4/2003 | Ahmad et al. | 378/119 |
| 2003/0219056 A1 | 11/2003 | Yager et al. | 372/57 |
| 2004/0047385 A1 | 3/2004 | Knowles et al. | 372/55 |
| 2005/0157383 A1* | 7/2005 | Tichenor et al. | 359/359 |
| 2005/0174576 A1 | 8/2005 | Rao et al. | 356/454 |

FOREIGN PATENT DOCUMENTS

| | | |
|---|---|---|
| JP | 03-173189 | 7/1991 |
| JP | 06-053594 | 2/1994 |
| JP | 09-219555 | 8/1997 |
| JP | 2000-058944 | 2/2000 |
| JP | 200091096 | 3/2000 |
| WO | WO2004/104707 | 12/2004 |

OTHER PUBLICATIONS

Apruzese, "X-Ray Laser Research Using Z Pinches," Am. Inst. Of Phys. 399-403, (1994).
Bollanti et al., "Compact Three Electrodes Excimer Laser IANUS for a POPA Optical System," SPIE Proc. (2206) 144-153, (1994).
Bollanti et al., "Ianus, the Three-Electrode Excimer Laser," App. Phys. B (Lasers & Optics) 66(4):401-406, (1998).
Braun et al., "Multi-Component EUV Multilayer Mirrors," Proc. SPIE, 5037:2-13 (2003).
Choi et al., "A $10^{13}$ A/s High Energy Density Micro Discharge Radiation Source," B. Radiation Characteristics, p. 287-290.
Choi et al., "Fast Pulsed Hollow Cathode Capillary Discharge Device," Rev. of Sci. Instrum. 69(9):3118-3122 (1998).
Choi et al., "Temporal Development of Hard and Soft X-Ray Emission from a Gas-Puff Z Pinch," Rev. Sci. Instrum. 57(8), pp. 2162-2164 (Aug. 1986).
Coutts et al., High Average Power Blue Generation from a Copper Vapour Laser Pumped Titanium Sapphire Laser, Journal of Modern Optics, vol. 45, No. 6, p. 1185-1197 (1998).
Feigl et al., "Heat Resistance of EUV Multilayer Mirrors for Long-Time Applications," Microelectric Engineering, 57-58:3-8, (2001).
Fomenkov et al., "Characterization of a 13.5nm Source for EUV Lithography based on a Dense Plasma Focus and Lithium Emission," Sematech Intl. Workshop on EUV Lithography (Oct. 1999).
Giordano et al., "Magnetic Pulse Compressor for Prepulse Discharge in Spiker-Sustainer Excitati Technique for XeCl Lasers," Rev. Sci. Instrum 65(8), pp. 2475-2481 (Aug. 1994).
Hansson et al., "Xenon Liquid Jet Laser-Plasma Source for EUV Lithography," Emerging Lithographic Technologies IV, Proc. of SPIE, vol. 3997:729-732 (2000).
Hercher, "Tunable Single Mode Operation of Gas Lasers Using Intracavity tilted etalons," Applied Optics, vol. 8, No. 6, Jun. 1969, pp. 1103-1106.
Jahn, Physics of Electric Propulsion, McGraw-Hill Book Company, (Series in Missile and Space U.S.A.), Chap. 9. "Unsteady Electromagnetic Acceleration," p. 257 (1968).
Kato, "Electrode Lifetimes in a Plasma Focus Soft X-Ray Source," J. Appl. Phys. (33) Pt. 1 No. 8:4742-4744 (1991).
Kato et al., "Plasma Focus X-Ray Source for Lithography," Am. Vac. Sci. Tech. B. 6(1): 195-198 (1988).
Lebert et al., "Soft X-Ray Emission of Laser-Produced Plasmas Using a Low-Debris Cryogenic Nitrogen Target," J. App. Phys., 84(6):3419-3421 (1998).

Lebert et al., "A Gas Discharge Based Radiation Source for EUV-Lithography," Intl. Conf. Micro and Nano-Engineering 98 (Sep. 22-24, 1998) Leuven, Belgium.
Lebert et al., "Investigation of Pinch Plasmas with Plasma Parameters Promising ASE," Inst. Phys. Conf. Ser. No. 125: Section 9, pp. 411-415 (1992) Schiersee, Germany.
Lebert et al., "Comparison of Laser Produced and Gas Discharge Based EUV Sources for Different Applications," Intl. Conf. Micro- and Nano-Engineering 98 (Sep. 22-24, 1998) Leuven Belgium.
Lee, "Production of Dense Plasmas in Hypocyloidal Pinch apparatus," The Phys. of Fluids, 20 (2):313-321 (1977).
Lewis, "Status of Collision-Pumped X-Ray Lasers," Am. Inst. Phys. pp. 9-16 (1994).
Lowe, "Gas Plasmas Yield X-Rays for Lithography," Electronics, pp. 40-41 (Jan. 27, 1982).
Malmqvist et al., "Liquid-Jet Target for Laser-Plasma Soft X-Ray Generation," Am. Inst. Phys. 67(12):4150-4153 (1996).
Maruyama et al., "Characteristics of High-Power Excimer Laser Master Oscillator Power amplifier System for Dye Laser Pumping", Optics Communications, vol. 87, No. 3, pp. 105-108 (1992).
Mather, "Formation of a High-Density Deuterium Plasma Focus," The Physics of Fluids, 8(2), 366-377 (Feb. 1965).
Mather et al., "Stability of the Dense Plasma Focus," Phys. of Fluids, 12(11):2343-2347 (1969).
Matthews et al., "Plasma Sources for X-Ray Lithography," SPIE, 333, Submicron Lithography, pp. 136-139 (1982).
Mayo et al., "A Magnetized Coaxial Source Facility for the Generation of Energetic Plasma Flows," Sci. Technol. vol. 4:pp. 47-55 (1994).
Mayo et al., "Initial Results on High Enthalphy Plasma Generation in a Magnetized Coaxial Source," Fusion Tech. vol. 26:1221-1225 (1994).
Nilsen et al., "Analysis of Resonantly Photopumped Na-Ne X-Ray-Laser Scheme," Am. Phys. Soc. 44(7):4591-4597 (1991).
Orme et al., "Electrostatic Charging and Deflection of Nonconventional Droplet Streams Formed from Capillary Stream Breakup," Physics of Fluids, 12(9):2224-2235, (Sep. 2000).
Orme et al., "Charged Molten Metal Droplet Deposition as a Direct Write Technology", MRS 2000 Spring Meeting, San Francisco (Apr. 2000).
Pant et al., "Behavior or Expanding Laser Produced Plasma in a Magnetic Field," Physica Sripta, T75:104-111, (1998).
Partlo et al., "EUV (13.5 nm) Light Generation Using a Dense Plasma Focus Device," SPIE Proc. on Emerging Lithographic Technologies III, vol. 3676, 846-858 (Mar. 1999).
Pearlman et al., "X-Ray Lithography Using a Pulsed Plasma Source," J. Vac. Sci. Technol., pp. 1190-1193 (Nov./Dec. 1981).
Porter et al., "Demonstration of Population Inversion by Resonant Photopumping in a Neon Gas Cell Irradiated by a Sodium Z Pinch," Phys. Rev. Let., 68(6);796-799, (Feb. 1992).
Price, "X-Ray Microscopy Using Grazing Incidence Reflection Optics," Am. Inst. Phys., pp. 189-199, (1981).
Qi et al., "Fluorescence in Mg IX Emission at 48.340 Å from Mg Pinch Plasmas Photopumped by Al XI Line Radiation at 48.338 Å," Them Am. Phys. Soc., 47(3):2253-2263 (Mar. 1993).
Scheuer et al., "A Magnetically-Nozzled, Quasi-Steady, Multimegawatt, Coaxial Plasma Thruster," IEEE: Transactions on Plasma Science, 22(6) (Dec. 1994).
Schriever et al., "Laser-Produced Lithium Plasma as a Narrow-Band Extended Ultraviolet Radiation Source for Photoelectron Spectroscopy," App. Optics, 37(7):1243-1248, (Mar. 1998).
Schriever et al., "Narrowband Laser Produced Extreme Ultraviolet Sources Adapted to Silicon/Molybdenum Multilayer Optics," J. of App. Phys., 83(9):4566-4571, (May 1998).
Shiloh et al., "Z Pinch of a Gas Jet," Physical Review Lett., 40(8), pp. 515-518 (Feb. 20, 1978).
Silfvast et al., "High-Power Plasma Discharge Source at 13.5 nm and 11.4 nm for EUV Lithography," SPIE, vol. 3676:272-275, (Mar. 1999).
Silfvast et al., Lithium Hydride Capillary Discharge Creates X-Ray Plasma at 13.5 Nanometers, Laser Focus World p. 13 (Mar. 1997).
Stallings et al., "Imploding Argon Plasma Experiments," Appl., Phys. Lett. 35(7), pp. 524-536 (Oct. 1, 1979).

Tada et al., "I-pm Spectrally Narrowed Compact ArF Excimer Laser for Microlithography", Laser and Electro-Optics, CLEO '96, CThG4, p. 374 (1996).

Tillack et al., "Magnetic Confinement of an Expanding Laser-Produced Plasma," UC San Diego, Center for Energy Research, UCSD Report & Abramoya—Tornado Trap.

Wilhein et al., "A Slit Grating Spectrograph for Quantitative Soft X-Ray Spectroscopy," Am. Inst. Of Phys. Rev. of Sci. Instrum., 70(3):1694-1699, (Mar. 1999).

Wu et al., "The Vacuum Spark and Spherical Pinch X-Ray/EUV Point Sources," SPIE, Conf. On Emerging Tech. III, Santa Clara, CA, vol. 3676:410-420, (Mar. 1999).

Yusheng et al., "Recent Progress of "Heaven-One" High Power KrF Excimer Laser Syste", Laser and Electro-Optics, CLEO/Pacific Rim '99, vol. 2, p. 302-303 (1999).

Zombeck, "Astrophysical Observations with High Resolution X-Ray Telescope," Am. Inst. Of Phys. pp. 200-209, (1981).

* cited by examiner

US 7,141,806 B1

EUV LIGHT SOURCE COLLECTOR EROSION MITIGATION

CROSS-REFERENCE TO RELATED APPLICATIONS

The present application is a continuation-in-part of U.S. patent application Ser. No. 11/174,442, entitled SYSTEMS AND METHODS FOR REDUCING THE INFLUENCE OF PLASMA-GENERATED DEBRIS ON THE INTERNAL COMPONENTS OF AN EUV LIGHT SOURCE, filed on Jun. 29, 2005, and Ser. No. 11/168,190, entitled filed on Jun. 27, 2005, the disclosures of which are hereby incorporated by reference.

FIELD OF THE INVENTION

The present invention related to EUV light source collector erosion mitigation.

BACKGROUND OF THE INVENTION

An EUV LPP light source using a plasma source material, e.g., tin as the source element suffers from erosion of the primary collector mirror. This erosion is due to sputtering by energetic plasma source material ions, e.g., tin ions and neutrals created by the LPP. Applicants according to aspects of embodiments of the present invention seek to address this issue.

SUMMARY OF THE INVENTION

An EUV light source collector erosion mitigation method and apparatus for a collector comprising a multilayered mirror collector comprising a collector outer surface composed of a capping material subject to removal due to a removing interaction with materials created in an EUV light-creating plasma, is disclosed which may comprise including within an EUV plasma source material a replacement material. The replacement material may comprise the same material as the capping material of the multilayered mirror. The replacement material may comprise a material that is essentially transparent to light in a selected band of EUV light, e.g., a spectrum of EUV light generated in a plasma of a plasma source material. The replacement material may comprise a material not susceptible to being etched by an etching material used to remove deposited plasma source material from the collector, e.g., a halogen etchant. The replacement material may comprise a material able to be laid down on the collector outer surface in a uniform smooth coating comprising a surface roughness which does not significantly impact the EUV reflectivity of the multilayer mirror of the collector. The replacement material may comprise a material that is soluble in liquid tin. The solubility of the replacement material in liquid tin may be such that it is sufficient to deliver replacement material to the collector outer surface at a rate sufficient to effectively offset erosion of the collector outer surface, e.g., in the range of 3–5 ppm, or 1–5 ppm, or 3–10 ppm, or 1–10 ppm. The replacement material may comprise a material compatible with the material of the capping layer of the collector multilayer mirror. The replacement material may comprise a material that will not readily diffuse through the material of the capping layer. The replacement material may comprise a material that is selected from the group of materials comprising materials that can withstand exposure to ambient atmosphere, materials that can be easily removed by some means prior to exposure to ambient atmosphere and materials that have reaction products when exposed to ambient atmosphere that are easily removed from the outer surface of the collector multilayer mirror.

DETAILED DESCRIPTION OF PREFERRED EMBODIMENTS

Figure 1:
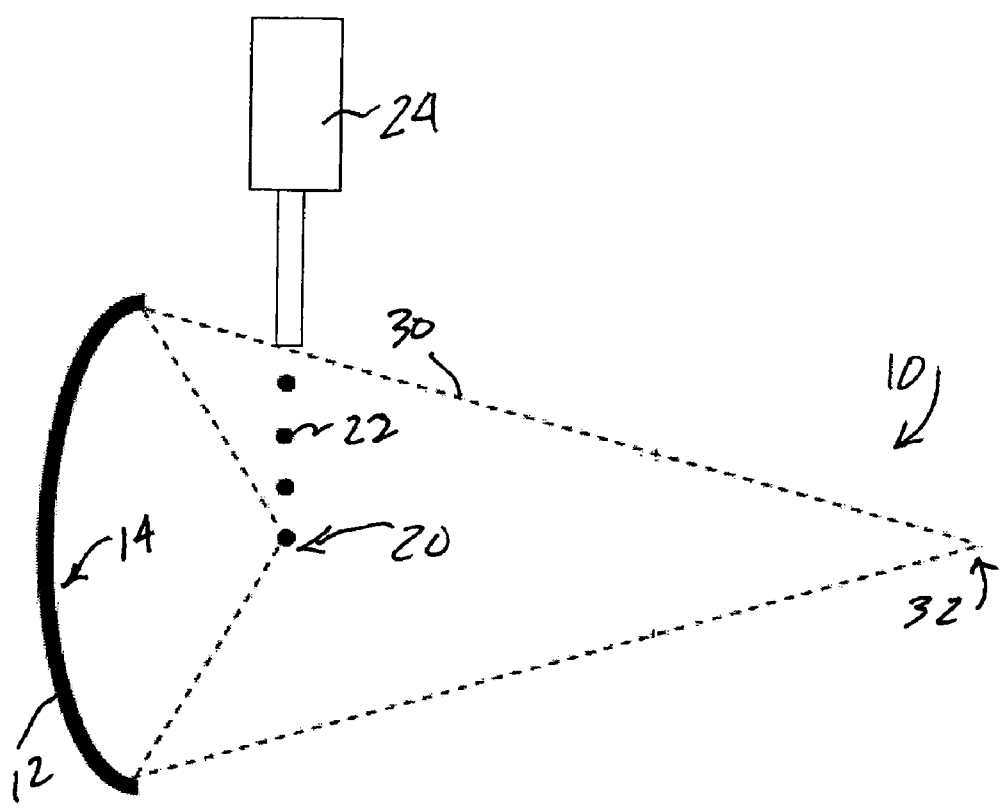
FIG. 1 shows schematically and by way of example an EUV light source according to aspects of embodiments of the present invention.

As shown schematically and by way of example in FIG. 1, an LPP EUV light source 10 may comprise an EUV light collector 12 having a collector outer surface 14. Plasma source material, e.g., tin or lithium, may be delivered to a plasma initiation site 20 in the form of target droplets 22, delivered from a target droplet generator 24. The target droplets 22, in turn, may be irradiated, e.g., by a laser beam (not shown) to form a plasma which emits EUV light, e.g., at about 13.5 nm wavelength. The collector 12 may comprise an elliptically shaped multilayer mirror for reflecting EUV light with a focus of the ellipse forming the mirror shape at the plasma initiation site 20 and focus a cone of EUV light 30 to an intermediate focus 32 at the second focus of the ellipse, where, e.g., the EUV light may be delivered to a device utilizing the light, e.g., an integrated circuit manufacturing process photolithography apparatus (not shown).

In order to achieve a commercially viable collector 12 lifetime this erosion rate must be greatly reduced or the eroded material must be replaced in-situ.

One method for providing replacement material, according to aspects of an embodiment of the present invention may be to include such replacement material as a small portion in the plasma source material target droplet 22 material. With such an arrangement, mirror replacement material, as well as the tin EUV source element, can be made to become incident on the primary collector surface. Both the tin and the replacement material can then adhere to the collector surface, but the halogen chemistry cleaning, e.g., as proposed in the above referenced co-pending patent applications can be used to remove the tin atoms, thereby leaving only the replacement material.

The replacement material could be selected to be the same as the capping layer of the collector's EUV multilayer mirror outer surface, e.g., molybdenum, but need not be. In the event that the replacement material is selected to be other than the capping layer material the properties for this replacement material include, e.g., that it be (1) highly transparent to the wavelength of the generated EUV light, e.g., at about 13.5 nm; (2) not susceptible to being etched, e.g., by the halogen chemistry used, e.g., to remove deposited tin and/or other debris deposited on the collector; (3) able to be laid down on the collector surface in a uniform, smooth fashion so that, e.g., the surface roughness of the outer surface of the multilayer mirror is not significantly impacted (and thus EUV reflectivity significantly degraded); (4) soluble in liquid tin to the level of, e.g., several parts per million (which is currently expected by applicants to be a concentration of replacement material needed to effectively offset erosion of the outer surface of the collector multilayer mirror); (5) compatible with the materials that make of the EUV reflective multilayer mirror, e.g., its capping layer and, e.g., not readily diffuse through its capping layer and or underlying reflectivity layer; and able to withstand exposure to air during vacuum vessel service or be easily removed by some means prior to opening the vacuum vessel or have reaction products with air that are easily removed once service is complete and the collector is back under vacuum.

Such a material may be, as noted above a capping layer material, e.g., molybdenum, but also may be, e.g., yttrium or ruthenium.

The concentration of the replacement material in the plasma source material, e.g., tin source target droplet must be selected to not be insufficient material, such as can lead to net erosion of the collector and also not be excessive, such as can lead to a loss of mirror reflectivity, e.g., due to a thick layer of the replacement material on the surface of the collector. Those skilled in the art can easily determine empirically without undue experimentation what this amount may be for a particular size of plasma target irradiated by a particular type (e.g., particular wavelength) and intensity of laser light of a particular configuration (e.g., vis-a-vis the cross-section of the target droplet) and other such well understood factors, however, currently for a tin target droplet of around 30 µm in diameter and $CO_2$ drive laser irradiation at intensity levels of around 100 mJ, applicants believe that around 1–10 ppm will be sufficient and not result in over deposition, however, the ranges may be narrower, e.g., 1–5, 3–5 or 3–10, and may vary with the factors noted above.

According to aspects of an embodiment of the present invention applicants propose an arrangement where the rate of deposition and erosion are essentially equal over essentially the entire surface of the collector. Since parts of the collector are closer to the plasma initiation site than others, a higher rate of influx can exist in some regions of the collector. According to applicants' proposal, however, such different rates of deposit are not necessarily a problem since the replacement material is, e.g., uniformly mixed with the tin and thus higher influx rates of tin will be accompanied by similarly high rates of replacement material and vice-versa. A problem can develop, e.g., if the sputter rate from the tin differs over the collector surface. For example, if a buffer gas is used to sap the energy of the tin ions to limit sputtering by the tin ions, then regions of collector surface further from the LPP can experience lower rates of erosion per incident atom/ion. Thus, the required ratio of replacement material to tin can be different. Such differing rates of erosion and deposition may be avoided, according to aspects of an embodiment of the present invention by, e.g., avoiding such other methods of erosion reduction, e.g., utilization of a buffer gas or buffer plasma, excepting, e.g., those that are distance and collector position independent, such as mechanical debris shields.

Those skilled in the art will understand that an EUV light source collector erosion mitigation method and apparatus for a collector comprising a multilayered mirror collector comprising a collector outer surface composed of a capping material subject to removal due to a removing interaction with materials created in an EUV light-creating plasma, is disclosed which may comprise including within an EUV plasma source material a replacement material. The replacement material may comprise the same material as the capping material of the multilayered mirror, e.g., molybdenum, which will be understood to meet most, if not all of the criteria noted herein. The replacement material may comprise a material that is essentially transparent to light in a selected band of EUV light, e.g. a spectrum of EUV light generated in a plasma of a plasma source material. Molybdenum, as a capping material and other potential capping materials have essentially the transparency required such that while serving the purpose of being a capping layer on an EUV reflective multilayer mirror they are transparent enough that the reduction in reflectivity is acceptable given the other advantages in such a system for generating EUV light as noted above that the material, e.g., molybdenum is acceptable. The replacement material may comprise a material not susceptible to being etched by an etching material used to remove deposited plasma source material from the collector, e.g., a halogen etchant. The replacement material may comprise a material able to be laid down on the collector outer surface in a uniform smooth coating comprising a surface roughness which does not significantly impact the EUV reflectivity of the multilayer mirror of the collector. The replacement material may comprise a material that is soluble in liquid plasma source material, e.g., tin or lithium. The solubility of the replacement material in liquid tin is sufficient to deliver replacement material to the collector outer surface at a rate sufficient to effectively offset erosion of the collector outer surface, e.g., in the range of 3–5 ppm, or 1–5 ppm, or 3–10 ppm, or 1–10 ppm. Depending on erosion rates and the materials used and given solubility for the materials these ranges may vary as will be understood by those skilled in the art and selection of materials and solubility, etc. can be done as will be understood by those skilled in the art, without undue experimentation. The replacement material may comprise a material compatible with the material of the capping layer of the collector multilayer mirror. The replacement material may comprise a material that will not readily diffuse through the material of the capping layer of the collector multilayer mirror of the collector multilayer mirror or the underlying layers or do damage to the reflectivity ability of the combination of the capping layer and the underlying layers or the combination of the underlying layers. The replacement material may comprise a material that is selected from the group of materials comprising materials that can withstand exposure to ambient atmosphere, materials that can be easily removed by some means prior to exposure to ambient atmosphere and materials that have reaction products when exposed to ambient atmosphere that are easily removed from the outer surface of the collector multilayer mirror.

While the particular aspects of embodiment(s) of the EUV LIGHT SOURCE COLLECTOR EROSION MITIGATION described and illustrated in this patent application in the detail required to satisfy 35 U.S.C. §112 is fully capable of attaining any above-described purposes for, problems to be solved by or any other reasons for or objects of the aspects of an embodiment(s) above described, it is to be understood by those skilled in the art that it is the presently described aspects of the described embodiment(s) of the present invention are merely exemplary, illustrative and representative of the subject matter which is broadly contemplated by the present invention. The scope of the presently described and claimed aspects of embodiments fully encompasses other embodiments which may now be or may become obvious to those skilled in the art based on the teachings of the Specification. The scope of the present EUV LIGHT SOURCE COLLECTOR EROSION MITIGATION is solely and completely limited by only the appended claims and nothing beyond the recitations of the appended claims. Reference to an element in such claims in the singular is not intended to mean nor shall it mean in interpreting such claim element "one and only one" unless explicitly so stated, but rather "one or more". All structural and functional equivalents to any of the elements of the above-described aspects of an embodiment(s) that are known or later come to be known to those of ordinary skill in the art are expressly incorporated herein by reference and are intended to be encompassed by the present claims. Any term used in the specification and/or in the claims and expressly given a meaning in the Specification and/or claims in the present application shall have that meaning, regardless of any dictionary or other commonly used meaning for such a term. It is not intended or necessary for a device or method discussed in the Specification as any aspect of an embodiment to address each and every problem sought to be solved by the aspects of embodiments disclosed in this application, for it to be encompassed by the present claims. No element, component, or method step in the present disclosure is intended to be dedicated to the public regardless of whether the element, component, or method step is explicitly recited in the claims. No claim element in the appended claims is to be construed under the provisions of 35 U.S.C. § 112, sixth paragraph, unless the element is expressly recited using the phrase "means for" or, in the case of a method claim, the element is recited as a "step" instead of an "act".

It will be understood by those skilled in the art that the aspects of embodiments of the present invention disclosed above are intended to be preferred embodiments only and not to limit the disclosure of the present invention(s) in any way and particularly not to a specific preferred embodiment alone. Many changes and modification can be made to the disclosed aspects of embodiments of the disclosed invention(s) that will be understood and appreciated by those skilled in the art. The appended claims are intended in scope and meaning to cover not only the disclosed aspects of embodiments of the present invention(s) but also such equivalents and other modifications and changes that would be apparent to those skilled in the art. In additions to changes and modifications to the disclosed and claimed aspects of embodiments of the present invention(s) noted above others could be implemented.

We claim:

1. An EUV light source collector erosion mitigation method for a collector comprising a multilayered mirror collector comprising a collector outer surface composed of a capping material subject to removal due to a removing interaction with materials created in an EUV light-creating plasma, the method comprising:
   including within an EUV plasma source material a replacement material.

2. The method of claim 1 further comprising:
   the replacement material comprises the same material as the capping material of the multilayered mirror.

3. The method of claim 1 further comprising:
   the replacement material comprises a material that is essentially transparent to light in a selected band of EUV light.

4. The method of claim 2 further comprising:
   the replacement material comprises a material that is essentially transparent to light in a selected band of EUV light.

5. The method of claim 3 further comprising:
   the selected band comprises a spectrum of EUV light generated in a plasma of a plasma source material.

6. The method of claim 4 further comprising:
   the selected band comprises a spectrum of EUV light generated in a plasma of a plasma source material.

7. The method of claim 1 further comprising:
   the replacement material comprises a material not susceptible to being etched by an etching material used to remove deposited plasma source material from the collector.

8. The method of claim 2 further comprising:
   the replacement material comprises a material not susceptible to being etched by an etching material used to remove deposited plasma source material from the collector.

9. The method of claim 7 further comprising:
   the etching material comprising a halogen.

10. The method of claim 8 further comprising:
    the etching material comprising a halogen.

11. The method of claim 1 further comprising:
    the replacement material comprises a material able to be laid down on the collector outer surface in a uniform smooth coating comprising a surface roughness which does not significantly impact the EUV reflectivity of the multilayer mirror of the collector.

12. The method of claim 2 further comprising:
    the replacement material comprises a material able to be laid down on the collector outer surface in a uniform smooth coating comprising a surface roughness which does not significantly impact the EUV reflectivity of the multilayer mirror of the collector.

13. The method of claim 1 further comprising:
    the replacement material comprising a material the is soluble in liquid tin.

14. The method of claim 2 further comprising:
    the replacement material comprising a material the is soluble in liquid tin.

15. The method of claim 13 further comprising:
    the solubility of the replacement material in liquid tin is sufficient to deliver replacement material to the collector outer surface at a rate sufficient to effectively offset erosion of the collector outer surface.

16. The method of claim 14 further comprising:
    the solubility of the replacement material in liquid tin is sufficient to deliver replacement material to the collector outer surface at a rate sufficient to effectively offset erosion of the collector outer surface.

17. The method of claim 13 further comprising:
    the solubility of the replacement material in liquid tin is in the range of 3–5 ppm.

18. The method of claim 14 further comprising:
    the solubility of the replacement material in liquid tin is in the range of 3–5 ppm.

19. The method of claim 15 further comprising:
    the solubility of the replacement material in liquid tin is in the range of 3–5 ppm.

20. The method of claim 16 further comprising:
    the solubility of the replacement material in liquid tin is in the range of 3–5 ppm.

21. The method of claim 13 further comprising:
    the solubility of the replacement material in liquid tin is in the range of 1–5 ppm.

22. The method of claim 14 further comprising:
    the solubility of the replacement material in liquid tin is in the range of 1–5 ppm.

23. The method of claim 15 further comprising:
    the solubility of the replacement material in liquid tin is in the range of 1–5 ppm.

24. The method of claim 16 further comprising:
    the solubility of the replacement material in liquid tin is in the range of 1–5 ppm.

25. The method of claim 13 further comprising:
    the solubility of the replacement material in liquid tin is in the range of 3–10 ppm.

26. The method of claim 14 further comprising:
    the solubility of the replacement material in liquid tin is in the range of 3–10 ppm.

27. The method of claim 15 further comprising:
the solubility of the replacement material in liquid tin is in the range of 3–10 ppm.
28. The method of claim 16 further comprising:
the solubility of the replacement material in liquid tin is in the range of 3–10 ppm.
29. The method of claim 13 further comprising:
the solubility of the replacement material in liquid tin is in the range of 1–10 ppm.
30. The method of claim 14 further comprising:
the solubility of the replacement material in liquid tin is in the range of 1–10 ppm.
31. The method of claim 15 further comprising:
the solubility of the replacement material in liquid tin is in the range of 1–10 ppm.
32. The method of claim 16 further comprising:
the solubility of the replacement material in liquid tin is in the range of 1–10 ppm.
33. The method of claim 1 further comprising:
the replacement material comprises a material compatible with the material of the capping layer of the collector multilayer mirror.
34. The method of claim 2 further comprising:
the replacement material comprises a material compatible with the material of the capping layer of the collector multilayer mirror.
35. The method of claim 1 further comprising:
the replacement material comprises a material that will not readily diffuse through the material of the capping layer of the collector multilayer mirror.
36. The method of claim 2 further comprising:
the replacement material comprises a material that will not readily diffuse through the material of the capping layer of the collector multilayer mirror.
37. The method of claim 33 further comprising:
the replacement material comprises a material that will not readily diffuse through the material of the capping layer of the collector multilayer mirror.
38. The method of claim 4 further comprising:
the replacement material comprises a material that will not readily diffuse through the material of the capping layer of the collector multilayer mirror.
39. The method of claim 1 further comprising:
the replacement material comprises a material that is selected from the group of materials comprising materials that can withstand exposure to ambient atmosphere, materials that can be easily removed by some means prior to exposure to ambient atmosphere and materials that have reaction products when exposed to ambient atmosphere that are easily removed from the outer surface of the collector multilayer mirror.
40. The method of claim 2 further comprising:
the replacement material comprises a material that is selected from the group of materials comprising materials that can withstand exposure to ambient atmosphere, materials that can be easily removed by some means prior to exposure to ambient atmosphere and materials that have reaction products when exposed to ambient atmosphere that are easily removed from the outer surface of the collector multilayer mirror.
41. An EUV light source comprising:
a collector comprising a multilayered mirror collector comprising a collector outer surface composed of a capping material subject to removal due to a removing interaction with materials created in an EUV light-creating plasma;
a plasma initiation target comprising a mixture of a plasma source material and a replacement material.
42. The apparatus of claim 41 further comprising:
the replacement material is in solution with the plasma source material.
43. The method of claim 41 further comprising:
the replacement material comprises the same material as the capping material of the multilayered mirror.
44. The method of claim 42 further comprising:
the replacement material comprises the same material as the capping material of the multilayered mirror.

* * * * *